UNITED STATES PATENT OFFICE.

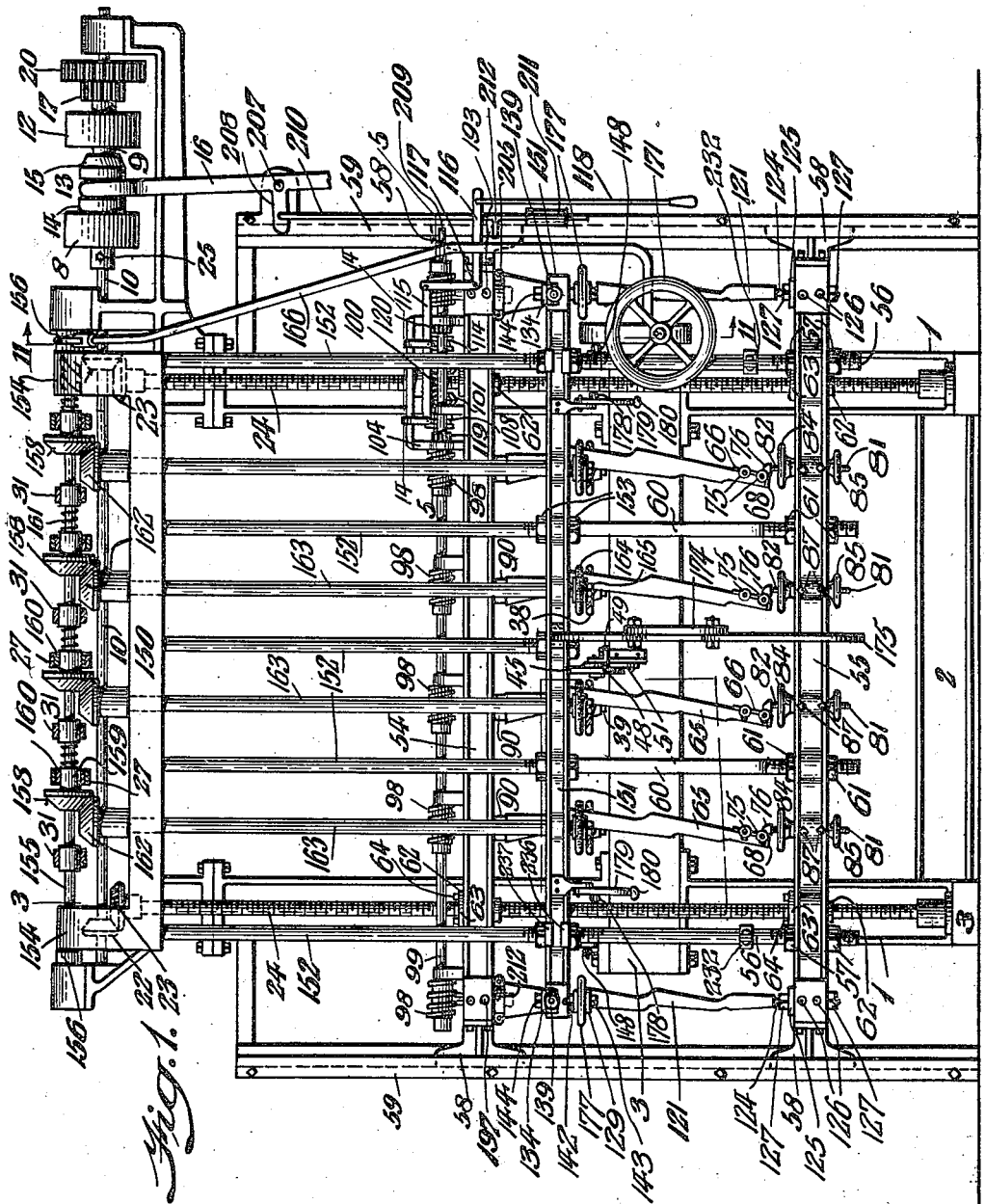

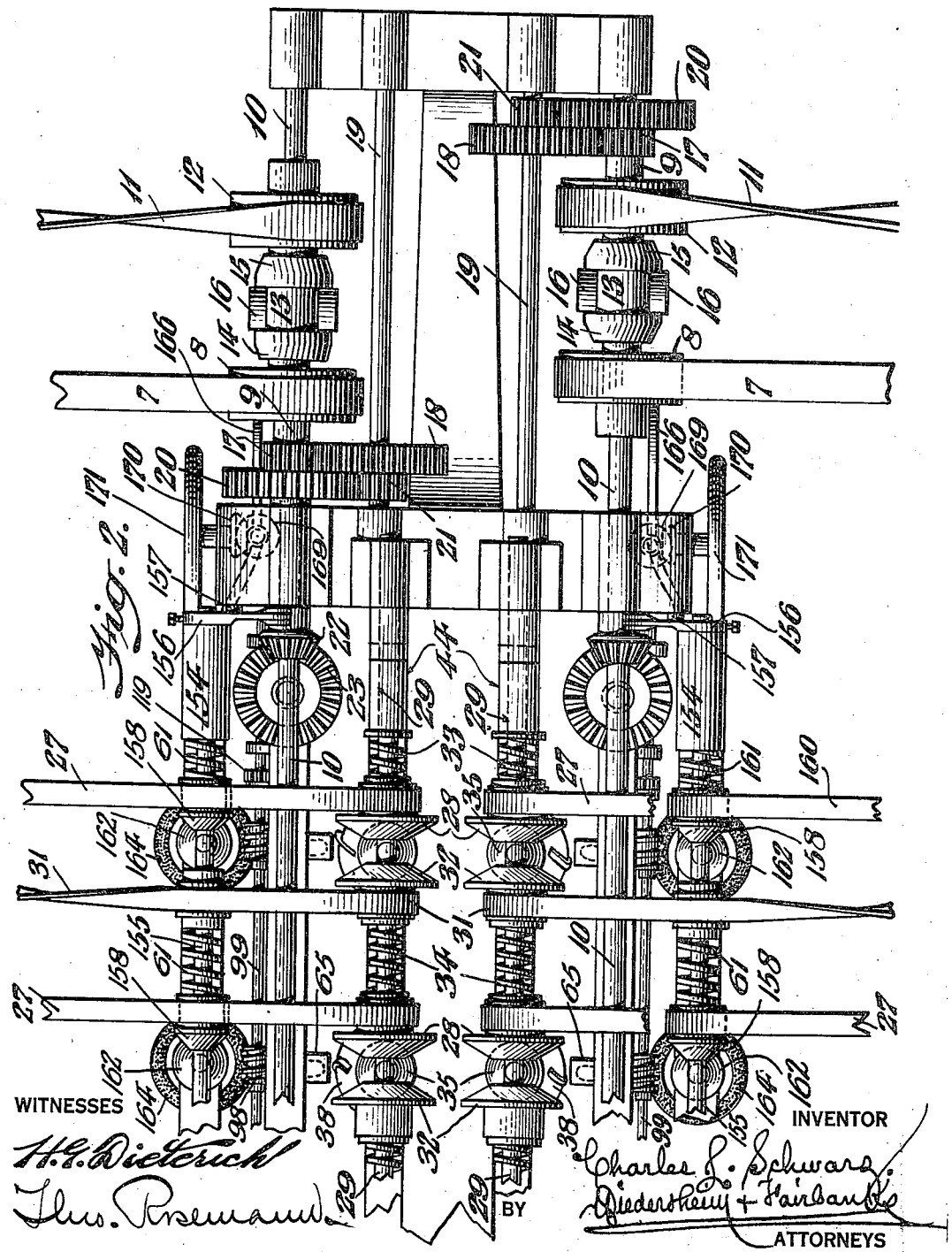

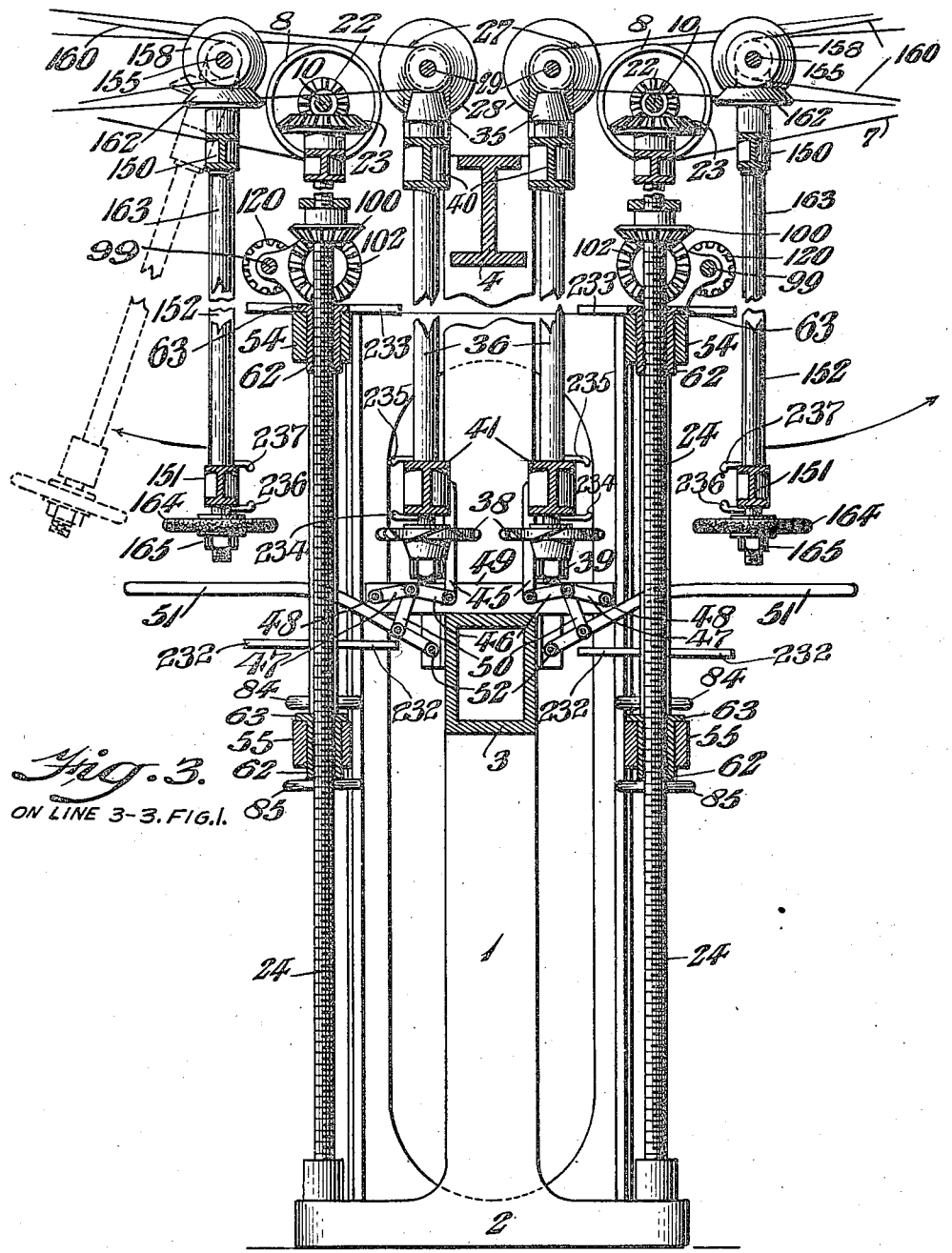

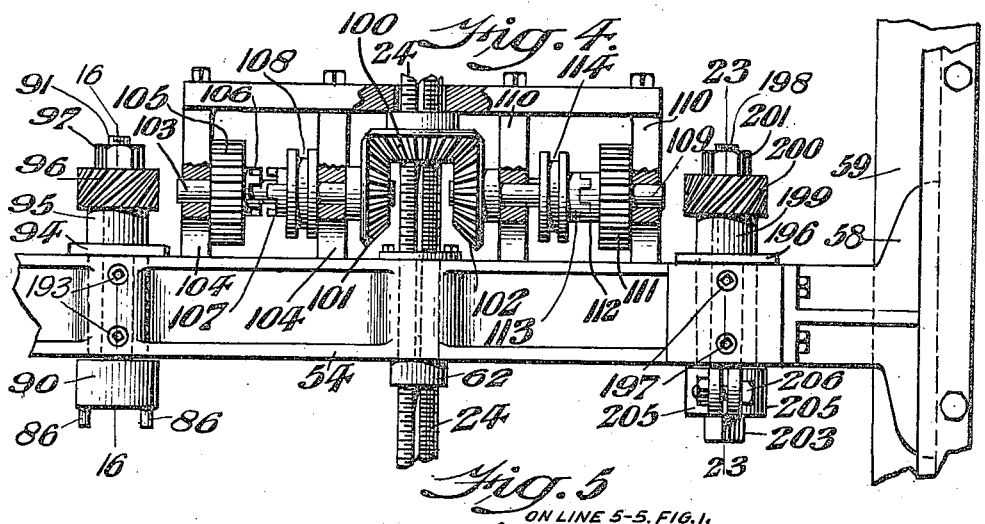
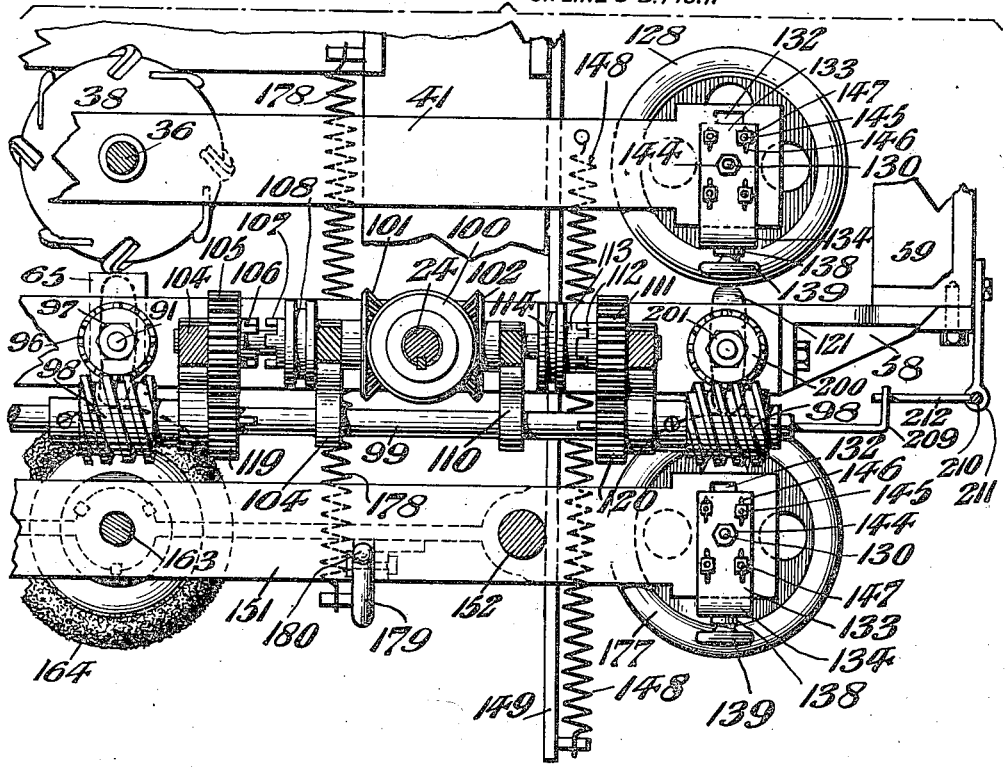

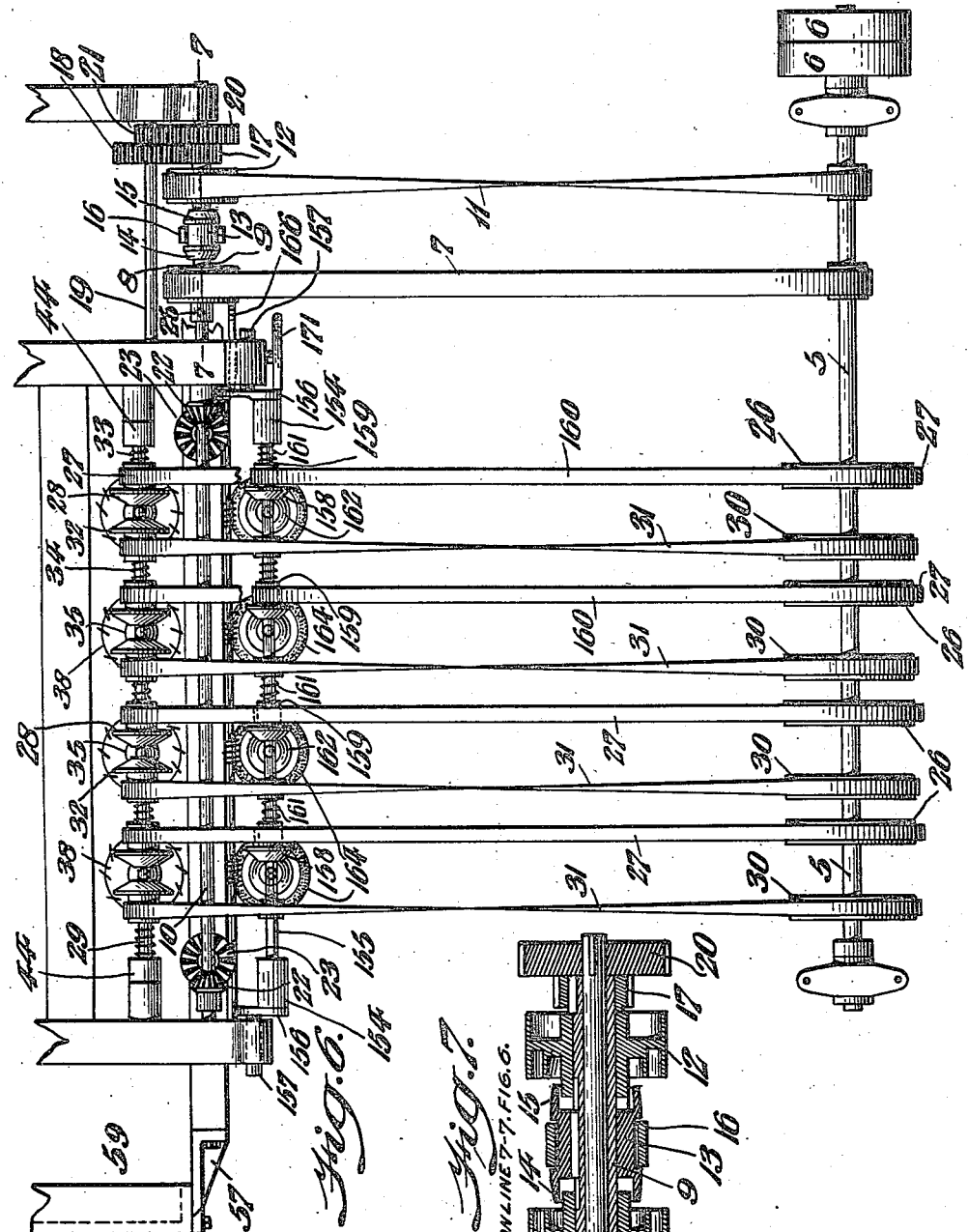

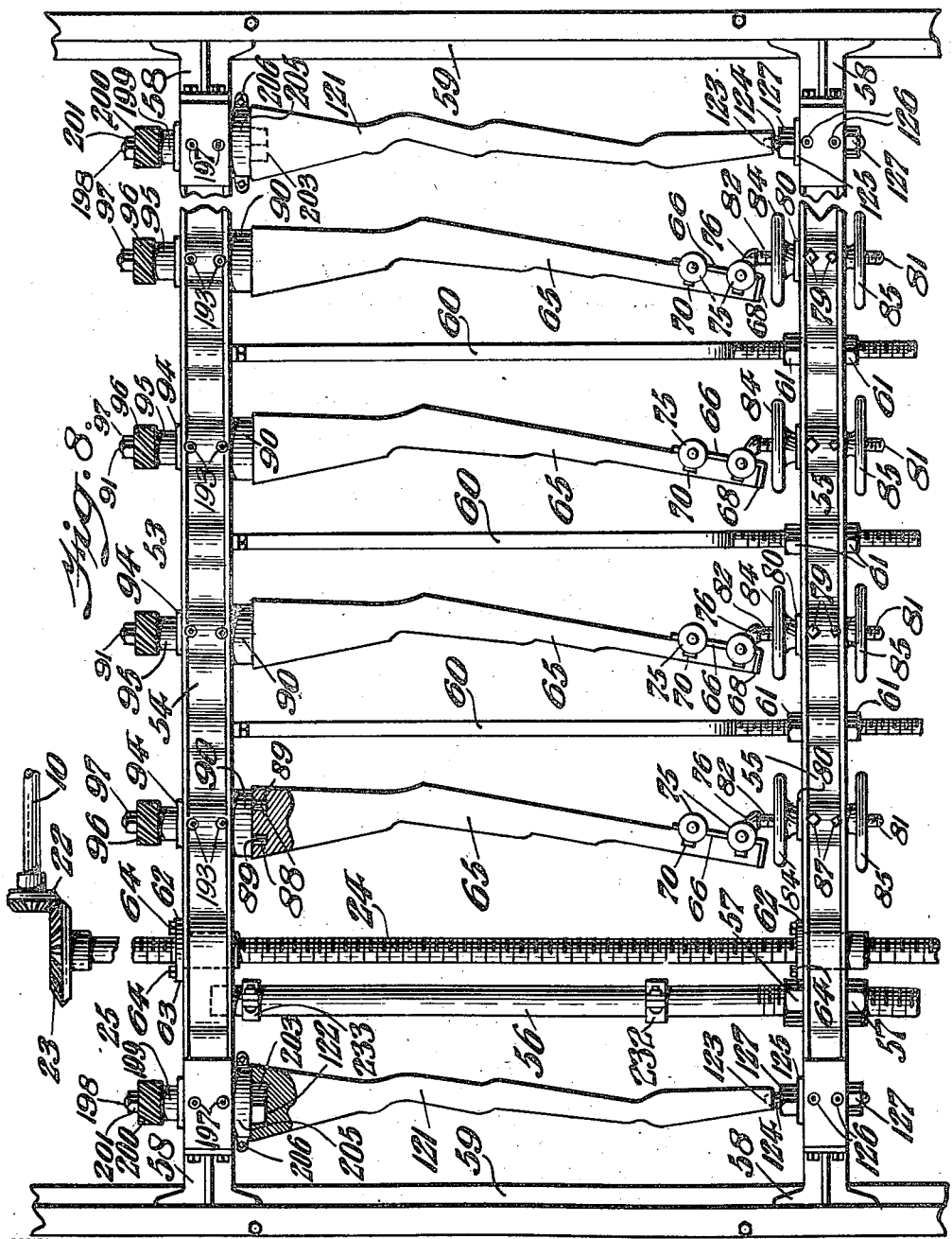

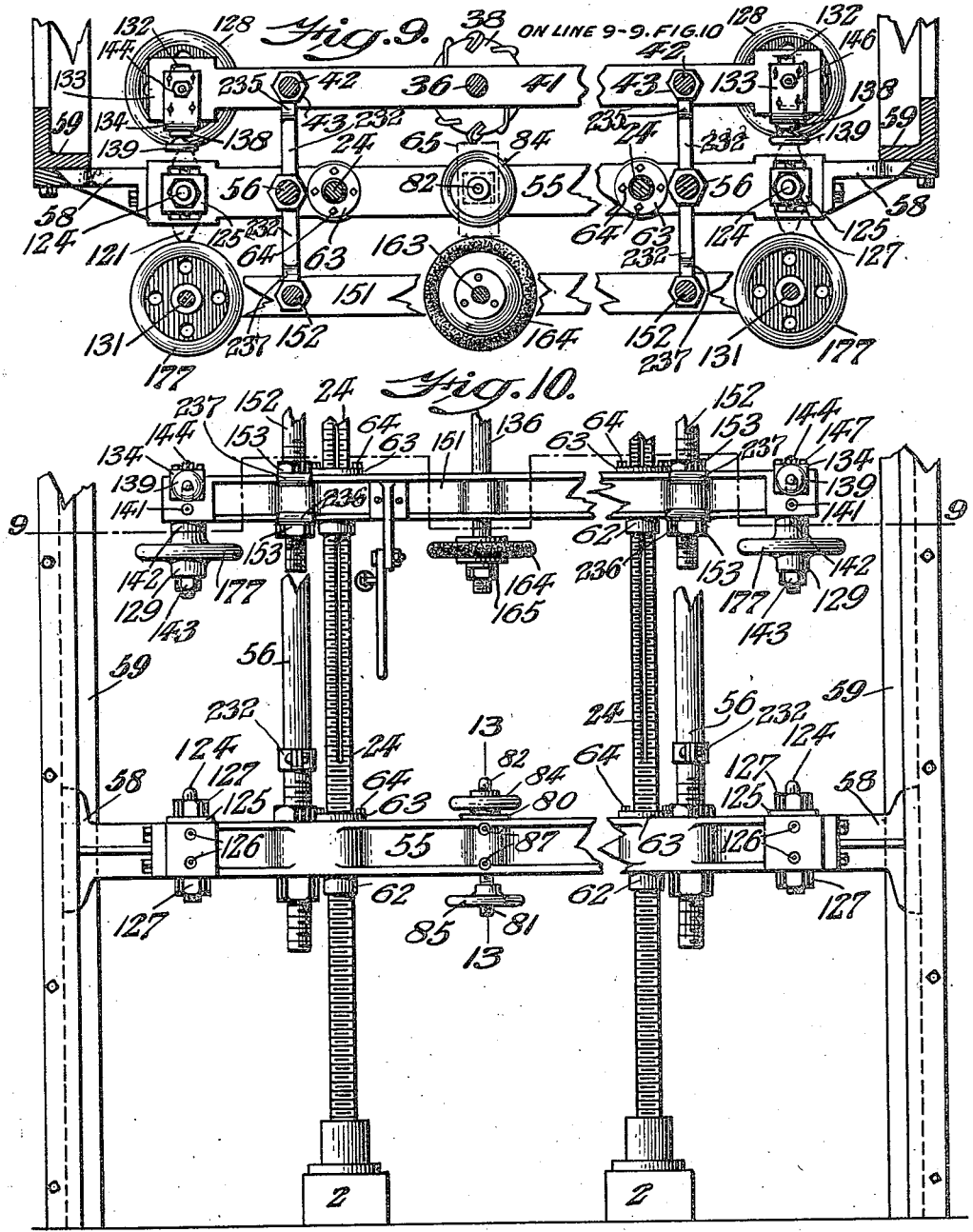

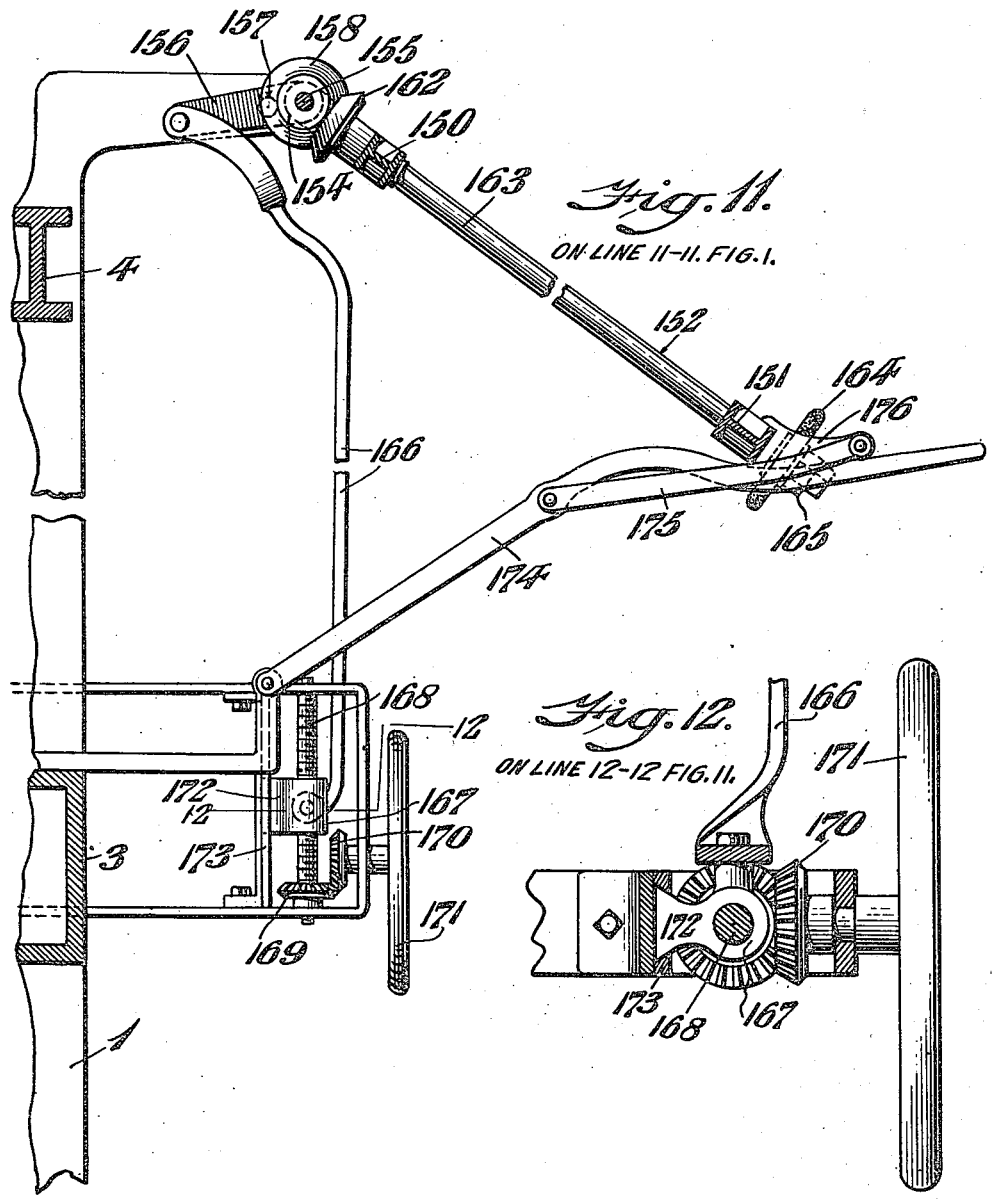

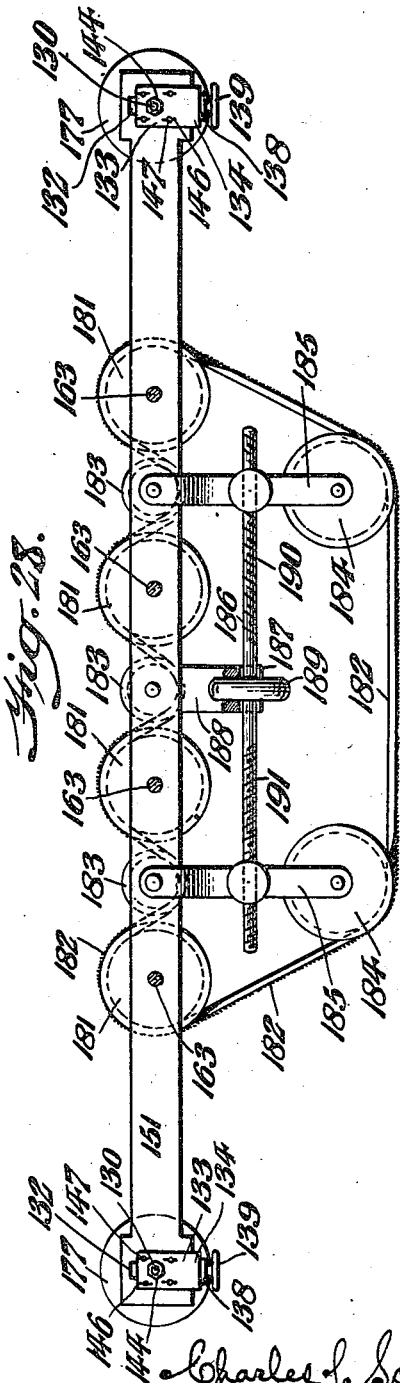

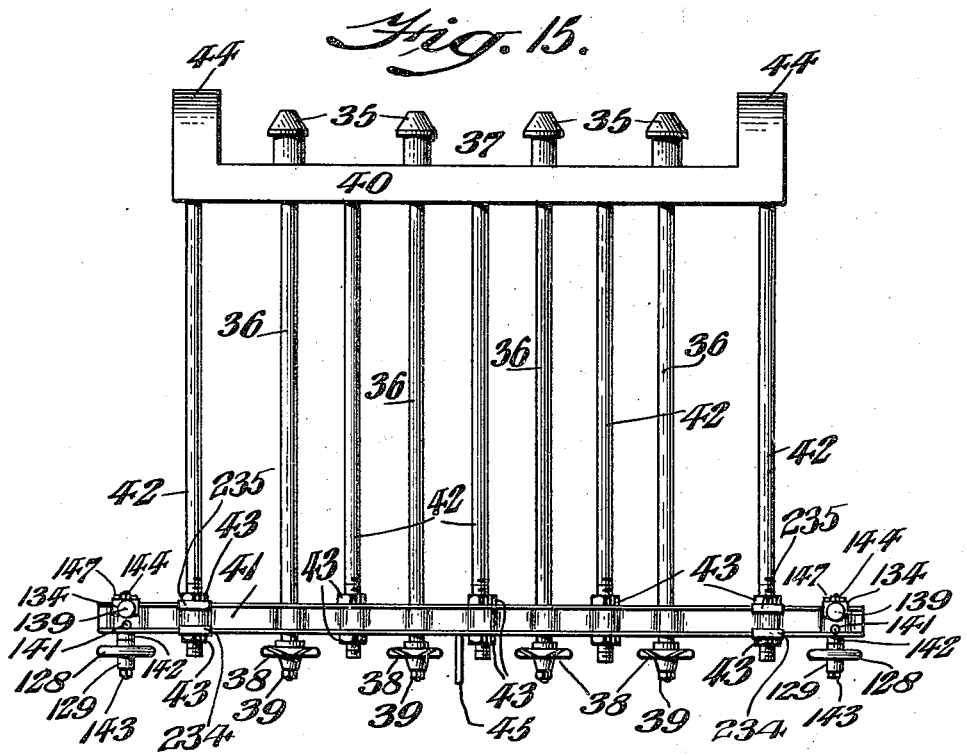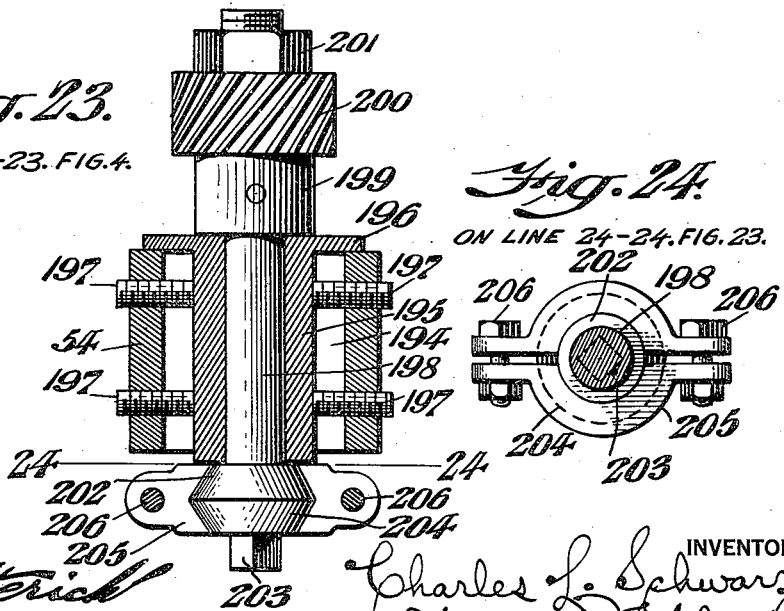

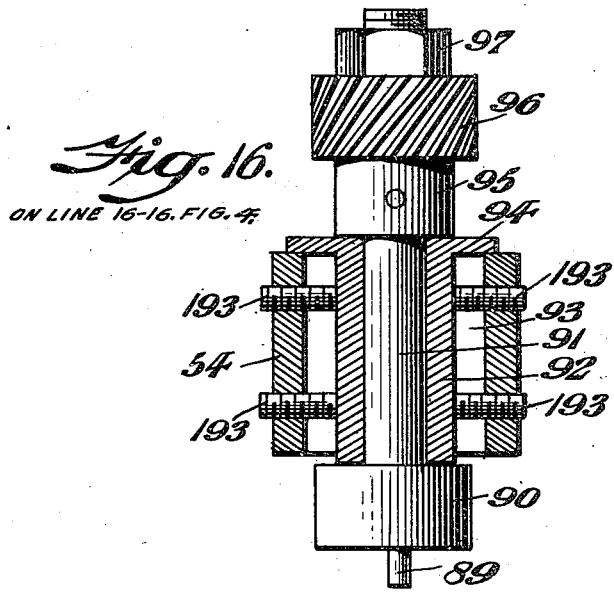
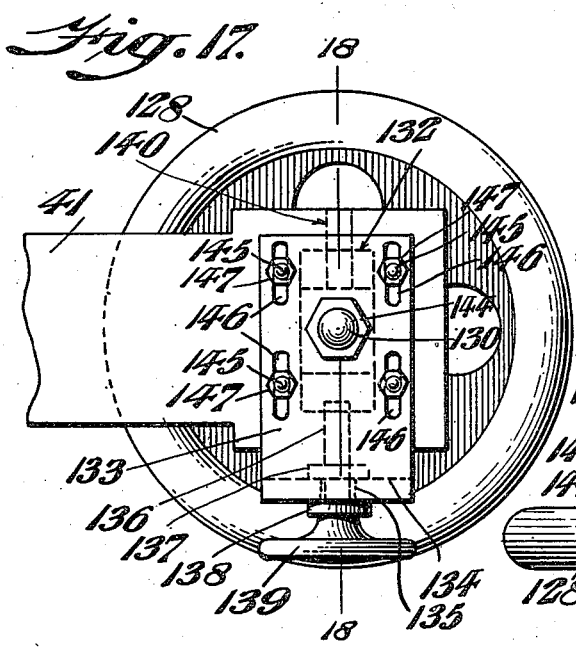
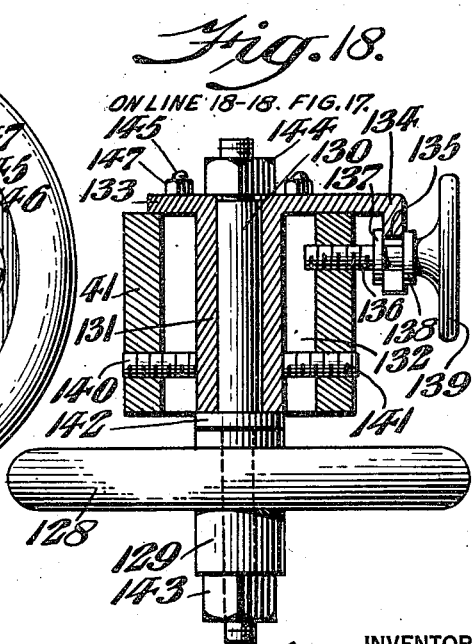

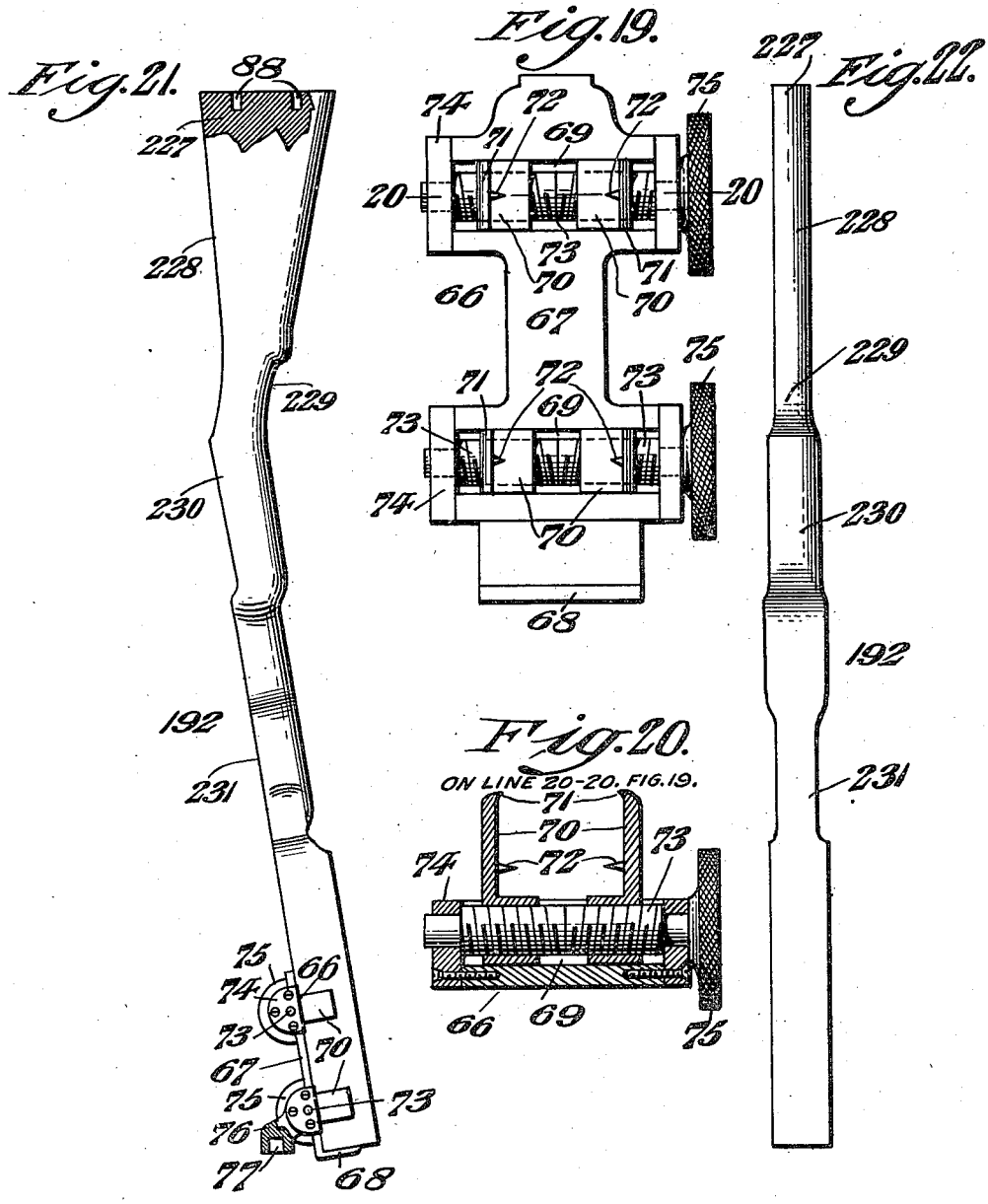

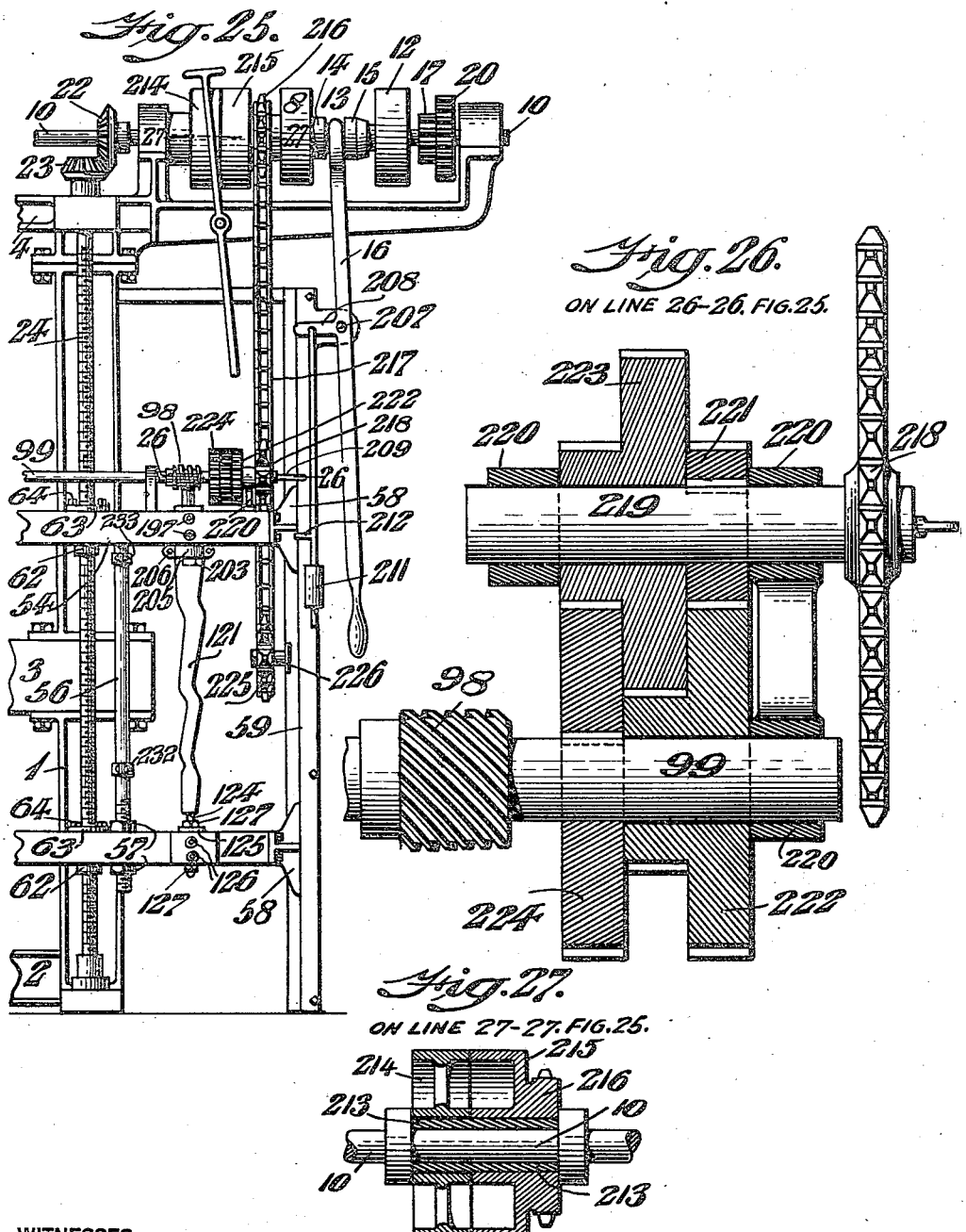

CHARLES L. SCHWARZ, OF PHILADELPHIA, PENNSYLVANIA.

COPYING-LATHE.

1,375,326.  Specification of Letters Patent.  Patented Apr. 19, 1921.

Application filed November 6, 1916. Serial No. 129,738.

*To all whom it may concern:*

Be it known that I, CHARLES L. SCHWARZ, a citizen of the United States, residing in the city and county of Philadelphia, State of Pennsylvania, have invented a new and useful Copying-Lathe, of which the following is a specification.

My present invention relates to a novel construction of a copying lathe which is especially adapted for the turning and also if desired the polishing of gun stocks although as will be apparent my invention is not limited to such use and may be employed for automatically reproducing from a master pattern any desired article and for automatically polishing or finishing such article.

The type of machine to which my invention relates is one which employs a reciprocatory carriage in which the master pattern and article blanks are adjustably connected and adapted to be rotated during the reciprocation of the carriage. In conjunction with such carriage a novel construction and arrangement of rotating cutters is employed, the cutter carrying frame having adjustably mounted therein tracer elements which are yieldingly retained in contact with the master pattern or patterns in the article receiving carriage. I also employ buffing or polishing elements which are opposed to the cutters and engage the side of the article blank opposite to that on which the cutter is operating. The buffer frame is provided with tracer elements adjustably secured therein and coöperating with the master pattern substantially diametrically opposite to the tracer elements on the cutter frame, whereby an equal tension is placed on both the master pattern and the article blank during the turning or forming operation.

With the above ends in view, my invention comprehends a novel construction of cutting mechanism, a novel construction of buffing or polishing mechanism, novel means for maintaining said mechanisms in operative position and novel means for effecting the operation of such mechanisms.

It further comprehends a novel construction of a frame-work, a novel construction of an article receiving carriage, novel means for adjustably securing therein the article blanks and the master pattern and effecting their rotation.

It further comprehends novel means for stopping the machine when the article receiving carriage approaches the limit of its upward or downward stroke, and automatically moving the buffer and cutting frames into inoperative position.

It further comprehends novel means for supporting the cutter frame and the polishing frame and a novel construction of manually operated means to move said cutter frame and said polishing frame into and out of operative position.

It further comprehends a novel construction and arrangement of centering devices for the article blanks and the master pattern and novel means for adjusting the tracer elements whereby the finished article will be an accurate reproduction of the master pattern or of larger or smaller dimensions.

Other novel features of construction and advantage too numerous to herein mention in detail will hereinafter more clearly appear in the detailed description of my invention and the appended claims.

For the purpose of illustrating my invention, I have shown in the accompanying drawings typical embodiments of it which in practice will give satisfactory and reliable results. It is, however, to be understood that these embodiments are typical only and that the various instrumentalities of which my invention consists can be variously arranged and organized and that my invention is not limited to the precise arrangement and organization of these instrumentalities as herein shown and described.

Figure 1 represents a front elevation, of a copying lathe, embodying my invention.

Fig. 2 represents a top plan view of a portion of my device.

Fig. 3 represents a section on line 3—3 of Fig. 1.

Fig. 4 represents a side elevation, partly broken away, of a portion of the lathe.

Fig. 5 represents a section on line 5—5 of Fig. 1.

Fig. 6 represents a top plan view of a portion of my device.

Fig. 7 represents a section on line 7—7 of Fig. 6.

Fig. 8 represents a side elevation partly broken away of the article receiving table and certain of its adjuncts.

Fig. 9 represents a section on line 9—9 of Fig. 10.

Fig. 10 represents in side elevation certain parts of the lathe.

Fig. 11 represents a section on line 11—11 of Fig. 1.

Fig. 12 represents a section on line 12—12 of Fig. 11.

Fig. 13 represents a section on line 13—13 of Fig. 10.

Fig. 14 represents a section on line 14—14 of Fig. 1.

Fig. 15 represents a front elevation of the cutter frame in detached position.

Fig. 16 represents a section on line 16—16 of Fig. 4.

Fig. 17 represents a top plan view of a portion of my device, showing more particularly a tracer and means for effecting its adjustment.

Fig. 18 represents a section on line 18—18 of Fig. 17.

Fig. 19 represents a top plan view of an article carrier.

Fig. 20 represents a section on line 20—20 of Fig. 19.

Fig. 21 represents, in side elevation and partly in section, a gun stock as completed by the copying lathe and before its carrier has been removed.

Fig. 22 represents a top plan view of the gun stock seen in Fig. 21.

Fig. 23 represents a section on line 23—23 of Fig. 4.

Fig. 24 represents a section on line 24—24 of Fig. 23.

Fig. 25 represents a front elevation, partly in section, of a portion of the machine.

Fig. 26 represents a section on line 26—26 of Fig. 25.

Fig. 27 represents a section on line 27—27 of Fig. 25.

Fig. 28 represents a detail of the polishing mechanism.

Similar numerals of reference indicate corresponding parts in the figures.

Referring to the drawings.

My present invention includes several distinct sets of mechanism, all of which coöperate as a concrete unitary structure and are brought into operation at the proper time, in order to produce the final product and I will therefore describe the various mechanisms in the logical sequence in which the different operations occur.

The frame of the machine.

In accordance with my present invention, the frame of the machine is constructed in such a manner that it will carry several independent units all of which can be controlled by a single operator. Each of such units is complete in performing the desired operations and in order to avoid duplication, I have described herein, in detail, but one of these units, and have given to corresponding parts the same reference characters.

1 designates the frame or housing of the machine which includes a base or foundation portion 2, an intermediate beam 3 and an upper beam 4, such parts being braced in any desired manner in order to provide the requisite rigidity of the frame.

The main driving mechanism.

Referring now more particularly to Fig. 6, 5 designates a driving shaft which is mounted in any desired or conventional manner and is provided with pulleys 6, one of which is loose on the shaft in the usual manner, it being understood that the other pulley 6 is fixed to the shaft 5 and is adapted to be driven by means of any desired source of power.

7 designates a belt, driven by the shaft 5 and passing around a pulley 8, see also Fig. 7, which is loosely mounted on a bushing 9 carried by the shaft 10, the latter being suitably journaled in the housing of the machine. 11 designates a belt driven from the shaft 5 and passing around a pulley 12, which is also loosely mounted on the bushing 9. The belt 11 is twisted to cause the pulley 12 to rotate in a reverse direction to the direction of rotation of the pulley 8, as is apparent to those skilled in this art.

13 designates a clutch collar keyed on the bushing 9 in order to provide for its relative longitudinal movement with respect to the shaft 10. The clutch collar 13 is provided on one side with the clutch member 14 adapted to interlock with the pulley 8 and on its opposite side with clutch member 15 adapted to interlock with the pulley 12. The clutch collar 13 is actuated by means of a shifting lever 16 which is automatically actuated in a manner hereinafter described.

17 designates a pinion, see also Fig. 7, which is keyed to the bushing 9 and meshes with a gear 18 fixed to a shaft 19 suitably journaled in the frame work of the machine.

20 designates a gear keyed to the shaft 10 and meshing with a pinion 21 mounted on the shaft 19. It will be seen from Fig. 7 that the bushing 9 is loosely mounted on the shaft 10 and the parts are maintained in position by a set collar 25 on the shaft 10. The shaft 10 has mounted thereon a plurality of beveled or other gears 22, two of which are employed in the present instance and which mesh with the gears 23 on the screws 24, which latter are suitably journaled in the frame work of the machine. These screws 24 effect the feed of the article receiving carriage 53, the construction and operation of which will hereafter be described in detail.

Cutter driving mechanism.

I will next describe the means for driving the cutters or other working tools employed, reference being directed more particularly to Figs. 1, 2, 3 and 6. I provide an independent cutting mechanism for each article which is to be produced and in the form illustrated, I have shown the copying lathe as being adapted to simultaneously form four articles at opposite sides of the machine, it being understood that it is within the scope of my invention to form simultaneously any desired number of articles, and since the cutters and their operating mechanism are constructed and operate in a similar manner, I have deemed it necessary to describe in detail but one of such mechanisms.

The drive shaft 5 (see more particularly Fig. 6) has mounted thereon a pulley 26 around which passes a belt 27, which latter also passes around the hub of a friction disk 28, which latter is loosely mounted on a shaft 29 journaled in the frame work of the machine.

30 designates a pulley mounted on the drive shaft 5 and around such pulley passes a belt 31, which also passes around the hub of a friction disk 32 which is loosely mounted on the shaft 29.

33 designates a spring or tension device which is arranged, as will be apparent from Fig. 6, to bear against the hub of the friction disk 28 and cause it to move toward the friction disk 32. 34 designates a spring interposed between the hub of the friction disk 32 and the hub of the friction disk 28 of the adjoining set of friction disks. It will be understood from the foregoing description that I provide a plurality of sets of friction disks preferably cone-shaped and tension devices are provided for moving each disk of a set toward the other disk of the same set.

35 designates a cone-shaped driven member in frictional engagement with the friction disks 28 and 32 of a set in order to frictionally drive a cutter shaft 36 which is vertically mounted within a cutter frame 37 and provided at its lower end with a cutter 38 which is retained on the shaft 36 by means of a nut 39 in threaded engagement with said shaft, the shaft being preferably provided with a collar against which the cutter 38 abuts, as will be apparent from Figs. 3 and 15.

The cutter frame.

The cutter frame 37, see more particularly Fig. 15, consists of an upper cross bar 40 and a lower cross bar 41 which are connected by means of the rods 42. The upper ends of such rods are fixed to the cross bar 40 in any desired manner while their lower ends are threaded and provided with nuts 43 located on opposite sides of the lower cross bar 41, whereby the distance between the upper and lower cross bars 40 and 41, respectively, may be varied in accordance with the requirements met with in practice. The upper cross bar 40 is provided with a desired number of hangers or straps 44 which are loosely mounted on the shaft 29 so that the cutter frame at its upper end is movably or pivotally supported, as will be apparent. The lower cross bar 41 of the cutter frame has connected therewith an arm 45 to the lower end of which is pivoted one end of a link 46, see Fig. 3, the other end of said link 46 being pivoted to a link 47 which is pivoted at 48 to a cross bar 49 carried by the machine frame. The links 46 and 47 are pivoted to one end of a link 50, thereby forming a toggle, and said link 50 is pivoted at its other end to a manually controlled lever 51, which is pivoted at 52 to a stationary portion of the frame. By such construction, the cutter frame and thereby the cutters may be adjusted laterally with respect to the blanks by the manual actuation of the lever 51.

The article receiving carriage.

The article blanks and the master patterns are carried by an article receiving carriage which is constructed and adapted to be reciprocated in a manner which will now be described, attention being directed more particularly to Figs. 1 and 8.

The article receiving carriage 53 is provided with an upper cross bar 54 and a lower cross bar 55, preferably constructed of channel beams in order to provide the requisite rigidity of the frame. 56 designates brace rods which are fixed to the upper cross bar 54 in any desired manner and the lower ends of these rods 56 are threaded and pass through the lower cross bar 55. Nuts 57 located on opposite sides of the cross bar 55 are provided for the rods 56, whereby the distance between the upper and lower cross bars of the article receiving carriage may be varied in accordance with the character of work which is to be accomplished.

The cross bars 54 and 55 have secured to opposite ends thereof in any desired manner the shoes or slides 58. These shoes 58 travel in the vertical guides 59 which form a part of the frame work of the machine. The article receiving carriage is stiffened by means of the brace strips 60, the upper ends of which are secured in any desired manner to the upper cross bar 54, while the lower ends of such strips are threaded and pass through the lower cross bar 55 and are provided with nuts 61 located on opposite sides of the lower cross bar 55, whereby the upper and lower cross bars may be properly braced between the article blanks.

The cross bars 54 and 55 are provided with the sleeve nuts or threaded bushings 62 which mesh with and are driven by the screws 24, and as illustrated, these sleeve nuts 62 each consists of an internally threaded bushing having a top flange 63 which is secured to its respective cross bar by means of fastening devices 64.

It will be understood from the foregoing that the reciprocatory article receiving carriage 53 is raised or lowered in accordance with the direction of rotation of the screws 24.

*Means for securing the articles in the article receiving carriage.*

In the embodiment of my invention herein illustrated, I have shown it as designed and adapted to turn gun stocks conforming to one or more master patterns carried by the article receiving carriage.

Referring now to Fig. 8, 65 designates the article blank from which a gun stock, for example, is to be formed. The lower end of the blank is supported in a carrier 66, the construction of which will now be described, and attention is directed more particularly to Figs. 8, 19, 20 and 21. This carrier 66 consists of a body portion 67 consisting of a plate or block, one end of which is deflected at an angle and preferably at substantially right angles, as seen at 68.

The body portion 67 is provided in its upper face with a desired number of lateral slots 69, two being employed in the present instance, and since these slots and clamping mechanism which they contain are constructed and operated in a similar manner, I have deemed it necessary to describe in detail but one of such slots and mechanism. Each slot 69 has mounted therein opposed clamping jaws 70, which are inwardly deflected at their upper ends, as at 71, to form gripping members and the jaws are provided between their top and bottom with a desired number of inwardly projecting pins 72. The lower ends of the clamping jaws are provided with hubs or enlargements, mounted on an adjusting screw 73, which is journaled in plates 74 secured in any desired manner to the body portion 67, and these screws 73 are provided with an actuating handle 75, whereby the adjusting screw can be manually actuated. The adjusting screws 73 have the threads thereon directed from their central portions in opposite directions, in other words, a right and a left hand threaded portion is provided, the right hand threaded portion coöperating with one clamping jaw and the left hand threaded portion coöperating with the other clamping jaw, whereby relative movement of the clamping jaws can be effected with a minimum amount of rotation of an adjusting screw 73. The lower portion of the article blank 65 is placed on the top face of the body portion 71 and its end abuts against the flange 68. The adjusting screws 73 are then tightened in order to securely clamp the carrier to the article blank. The bottom face of the carrier 66 is provided preferably near one end with an offset lug 76, which is recessed as at 77, in order to receive a centering device the construction of which will now be described, and attention is now directed more particularly to Figs. 13 and 8.

The lower cross bar 55 of the article receiving frame is apertured, as at 78, in order to receive the sleeves 79 which are each provided with a top flange 80 which rests upon the upper face of the cross bar 55. 81 designates a threaded rod serving as a center and having its upper end preferably cone-shaped, as at 82. This rod 81 is keyed to the sleeve 79 by means of a key 83, so that the rod 81 is longitudinally adjustable within the sleeve 79 and at the same time its relative rotation is prevented.

84 designates an upper adjusting nut in the form of a hand wheel which is in threaded engagement with the rod 81 and bears against the upper end of the sleeve 79. 85 designates an adjusting nut which is in the form of a hand wheel in threaded engagement with the rod 81 and which bears against the bottom of the sleeve 79. In order to provide for the accurate adjustment laterally of each centering rod 81, I provide the adjusting screws 86 which pass through and are in threaded engagement with one side of the cross bar 55 and abut against the sleeve 79, and on the opposite side of the cross bar 55 I provide the adjusting screws 87, which are in threaded engagement with such cross bar and abut against the sleeve 79.

The upper end of each article blank 65 is connected with means to effect its rotation and to this end is provided with the apertures 88, see Fig. 21, into which are adapted to extend the driving pins 89 which are adjustably carried by the upper cross bar 54 of the article receiving frame and which are rotatably mounted therein.

Referring now more particularly to Figs. 8 and 16, it will be seen that the pins 89 depend from the enlarged shoulder or collar 90 fixed in any desired manner to a shaft 91, which is journaled in a sleeve 92 located within an aperture 93 in the upper cross bar 54 and adapted to be laterally adjusted therein in a similar manner to the adjustment of the sleeves 79 owing to the provision of the set screws 193 in threaded engagement with opposite sides of the cross bar 54 and bearing against the sleeve 92. The sleeve 92 is provided at its upper end with the laterally extending flange 94 which rests upon the top face of the cross bar 54.

95 designates a collar fixed to the shaft 91 in any desired manner and above the collar is mounted a worm gear 96 which is fixed to the shaft 91 and secured in position by means of a nut 97 in threaded engagement with the upper end of the shaft 91, in order that the gear 96 may be removed when desired. The worm gears 96 mesh with the worms 98 which are mounted on a worm shaft 99 journaled in the cutter frame in any desired manner, see also Figs. 1 and 5.

*Means for rotating the blanks and the master patterns.*

The means provided for effecting the rotation of the blanks and the master patterns during the up and down movement of the article receiving frame are operated from one of the screws 24 which control the movement of the article receiving frame, and provision is made whereby the direction of rotation of the blanks and the master patterns may be reversed when desired. This construction will now be described and attention is directed more particularly to Figs. 1, 4, 5 and 14. Keyed to one of the screws 24 so as to be longitudinally movable thereon and rotatable in unison therewith is a gear 100 which is in mesh with the gears 101 and 102. The gear 101 is fixed to a shaft 103 which is journaled in standards 104 carried by the upper cross bar 54 of the article receiving carriage.

105 designates a gear loosely mounted on the shaft 103 and provided with clutch members 106 which are adapted to interlock with the clutch members 107 of a clutch collar 108 which is keyed to the shaft 103 so as to be slidable thereon. The gear 102 is fixed to a shaft 109 which is journaled in standards 110 carried by the upper cross bar 54 of the article receiving frame. The shaft 109 has loosely mounted thereon a gear 111 provided with clutch members 112 which are adapted to coöperate with clutch members 113, the latter being carried by a clutch collar 114 which is keyed to the shaft 109 so as to be longitudinally movable thereon. The clutch collars 108 and 114 are operatively connected to a frame 115, see Fig. 14, whereby they may be simultaneously shifted and this frame has connected with it a lever 116 which is pivotally supported at 117 on the article receiving frame.

118 designates a rod connected with the lever 116, see Fig. 1, in order that such lever may be manually actuated. The gear 105 meshes with a gear 119 fixed to the worm shaft 99 and the gear 111 meshes with a gear 120 on the worm shaft 99. By such construction, provision is made for effecting the rotation of the worm shaft 99 and thereby of the master patterns and the article blanks in a clockwise or counterclockwise direction.

121 designates the master patterns, two of which are employed in the present instance, and these are mounted at each end of the article receiving frame 53. The upper end of each master pattern is provided with a polygonally shaped aperture 122 in order to receive the pin or driving lug 89, it being seen from Fig. 23 that the means for driving the master patterns are different in construction from the means employed for rotating the article blanks 65. The lower ends of the master patterns are recessed, as at 123, in order to receive an adjustable center 124, which is mounted in a sleeve 125 corresponding in construction to the sleeves 79, and set screws 126 are provided on opposite sides of the lower cross bar 55 in order to effect a lateral adjustment of the center 124. Each center 124 consists of a threaded rod having its upper end rounded or cone-shaped, said rod being provided with nuts 127 located on opposite sides of the cross bar 55 in order to secure the center 124 in its adjusted position.

Referring now to Fig. 23, the upper cross bar 54 of the article receiving carriage 53 is apertured as at 194 to receive the sleeves or bushings 195 which are provided with top flanges 196 resting on the upper cross bar 54. The lateral adjustment of the sleeves 195 is effected by set screws 197. 198 designates shafts journaled in the sleeves 195 and provided with collars 199 above which are located gears 200 secured in position by nuts 201. The lower ends of the shafts 198 have fixed thereto the heads 202 which are flat on their ends and have their outer face cone shaped. 203 designates a polygonal shaped center forming lug which is carried by a cone shaped head 204, the end face of which is flat. The cone shaped heads 202 and 204 when assembled have their outer faces reversely inclined and adapted to fit a correspondingly shaped recess in a split collar or locking ring 205 the parts of which are retained in position by fastening devices 206 such as for example the bolts and nuts seen in Fig. 23. By such construction the master patterns may be accurately positioned without disconnecting their gearing since as is apparent, the center 203 may be rotatably adjusted upon loosening the fastening devices 206.

*The tracers.*

In order that the article blanks will be accurately reproduced from the master patterns, I provide means for effecting the feed of the cutters relatively to the article blanks in accordance with the contour of the master pattern. The lower cross bar 41 of the cutter frame has its opposite ends enlarged in order to receive the mounting for the tracers 128, the construction of which will be best understood by reference to Figs. 1, 5, 9, 17 and 18. The tracers consist of a wheel or disk having its outer periphery rounded and provided at its central portion with a hub which is loosely mounted on the reduced end 129 of a shaft 130, see Figs. 17 and 18. The shaft 130 is mounted in a sleeve 131 which is contained within an aperture 132 in the end of the lower cross bar 41 of the cutter frame. The sleeve 131 is provided at its upper end with a laterally extending flange 133 which rests upon the upper face of the cross bar 41. This flange 133 is provided with an offset or depending portion 134 which is apertured at 135 to receive a screw 136, which is in threaded engagement with the cross bar 41. On opposite sides of the offset 135, the screw 136 is provided with the collars or shoulders 137 and 138, whereby when the actuating handle 139, such as for example, the hand wheel seen in Fig. 18, is rotated, the lateral adjustment of the sleeve 131 and thereby of the tracing pattern is effected. By such construction the tracers may be adjusted so that the article blank will have the same size as the master pattern or can be made smaller or larger than the master pattern. In order to fix the sleeve 131 in its adjusted position, set screws 140 and 141 are provided located on opposite sides of the sleeve 131 and in threaded engagement with the cross bar 41. The shaft 130 is provided with a shoulder 142 against which the hub of the tracer 128 abuts, and the tracer is secured in position by means of a nut 143 in threaded engagement with the lower end of the shaft 130. The upper end of the shaft 130 is provided with a nut 144 in threaded engagement with it and bearing against the flange 133.

The cross bar 41 has fixed therein the threaded rods 145 which extend through slots 146 in the top flange 133 and are provided with nuts 147, whereby the sleeve 131 may be securely locked in its adjusted position on the lower cross bar 41. In order to retain the periphery of the tracer 128 at all times in contact with the pattern, the cutter frame is provided with a tension device which consists of a spring 148, one end of which is secured to the lower cross bar 41 of the cutter frame, while its opposite end is secured to a fixed portion of the frame work, such as for example, the arm 149, see Fig. 5.

*The polishing mechanism and its actuating means.*

The polishing mechanism comprises a polishing frame consisting of the upper and lower cross bars 150 and 151, respectively, see Figs. 1, 3 and 11, which are connected by means of rods 152, the upper ends of which are secured in any desired manner with respect to the upper cross bar 150, while the lower ends are threaded and pass through the lower cross bar 151 and are provided on opposite sides of said lower cross bar with nuts 153, whereby the distance between the upper and lower cross bars of the buffing frame may be adjusted as desired.

The upper cross bar 150 is provided with the straps or hangers 154 which are loosely mounted on the crank shaft 155, which latter is journaled in the journal brackets 156, said journal brackets being pivoted at 157 to the frame work of the machine. The shaft 155 has mounted thereon a desired number of friction driving disks 158 which are provided with a hub 159 forming a pulley around which passes a belt 160, said belt 160 also passing around the pulley 26 which is mounted on the main driving shaft 5.

161 designates springs which are mounted to bear against the hubs 159 to maintain the friction disks 158 in proper alinement. The friction disks 158 contact with friction disks 162 which are connected to shafts 163 journaled in the cross bars 150 and 151 of the polishing frame. The lower ends of the shafts 163 have mounted thereon the polishers, buffers or finishing tools 164 which are retained in position by means of nuts 165 in threaded engagement with the lower ends of the buffer shafts 163.

In accordance with my present invention, the cutters operate on the article blanks during the movement of the article receiving carriage in both an upward and a downward direction, and since the buffers act on the article blanks after they have been cut and formed, provision is made to cause the buffers 164 to be located above the cutters on the downward movement of the article receiving carriage and to locate the buffers beneath the cutters on the upward movement of the article receiving carriage.

Referring now more particularly to Figs. 1, 11 and 12, one of the brackets 156 forms a crank arm and has pivoted to it a link 166, the other end of which is pivotally connected to a shoe 167, which is in threaded engagement with a shaft 168 journaled in the machine frame. Fixed to the shaft 168 is a gear 169 which meshes with a gear 170 rotatably mounted in the machine frame and provided with an actuating handle 171 preferably in the form of a hand wheel, as illustrated. The shoe 167 has a guide 172 which travels in guide ways 173. By such construction the brackets 156 may be rocked to effect the raising or lowering of the buffer frame in order to position the buffers above the cutters on the downward travel of the article receiving carriage and to position the buffers below the cutters on the upward movement of the article receiving carriage. In order to move the polishing frame into and out of its operative position, I provide a lever 174 having one end pivoted to the machine frame and pivotally connected intermediate its ends to one end of a link 175, the opposite end of which is pivoted to an arm 176 connected with the lower cross bar 151 of the polishing frame. The lower cross bar 151 has adjustably mounted at its ends the tracers 177 which are constructed and mounted in a similar manner to the tracers 128 and in order to avoid needless repetition I have employed the same reference characters for the means employed to support and adjust the tracers 177 as have been used to identify similar means for the tracers 128. In order to maintain the tracers 177 in contact with the master patterns, I provide tension devices consisting of one or more springs 178 one end of a spring being connected to a stationary portion of the machine frame while its opposite end is connected to an eccentric arm 179 pivoted to the lower cross bar 151 and provided with a grasping knob 180.

It will be understood from the foregoing that the tracers of the polishing and cutter frames are located on opposite sides of the master pattern and are moved toward the master patterns by tension devices so that an equal pressure is placed on the master patterns and their movement out of alinement which would occur if the pressure is on one side only of the master patterns is eliminated.

The same principle holds true of the article blanks since the cutting and polishing elements are opposed to each other and located on opposite sides of an article blank and moved toward such blank by the tension devices for the polishing and cutter frames. This prevents the springing of the article blanks so that one is enabled to obtain an exact reproduction of the master pattern.

*Means to automatically stop the machine.*

The machine can be stopped or started by manually actuating the shifting lever 16. I also provide means controlled by the article receiving carriage to arrest the rotation of the cutters and the reciprocation of the carriage, attention being directed to Figs. 1, 5 and 25. The lever 16 is fulcrumed at 207 and provided with a laterally extending arm 208 which is in the path of a contact member 209 fixed to the article receiving carriage. Secured to the arm 208 is a rod 210 the lower end of which is guided in a bracket 211. This rod 210 is provided with a laterally extending arm 212 which is in the path of the contact member 209. The arms 208 and 212 are so positioned that the lever 16 will automatically move the clutch collar 13 into its neutral position when the article receiving carriage approaches or reaches the limit of its upward or downward stroke.

In Figs. 25 and 26, I have shown another means for effecting the rotation of the worm shaft 99 which can be employed if desired, the shaft 10 has loosely mounted thereon a bushing 213 provided with a loose pulley 214 and a fixed pulley 215 designed to be driven by a belt from the shaft 5. 216 designates a sprocket wheel fixed on the bushing 213 and coöperating with a sprocket chain 217 which also passes around a sprocket wheel 218 mounted on a stud shaft 219 journaled in a bracket 220. Keyed to the shaft 219 is a gear 221 which meshes with a compound gear 222 loose on the shaft 99. The gear 222 also meshes with a compound gear 223 loose on the shaft 219 and said gear 223 also meshes with a gear 224 fixed on the shaft 99. The sprocket chain 217 also passes around a sprocket wheel 225 on a stud shaft 226.

In Figs. 21 and 22, I have shown the article 192 as it comes from the copying lathe. The forward end portion of the gun stock is turned and polished in another machine.

In some cases it is advantageous to employ, in lieu of the buffing disks 164, the construction seen in Fig. 28, or its equivalent. The lower cross bar 151 is provided with the tracers 177, as before described, and the frictionally driven shafts 163 carry the pulleys 181 around which passes a buffing or finishing belt 182. I provide a novel construction of belt tightener comprising the grooved idlers 183 carried by the lower cross bar 151 and grooved idlers 184 carried by arms 185 pivotally supported on the lower cross bar 151 and provided with means to effect their relative adjustment. 186 designates a screw rotatably mounted in a groove 187 in an arm 188 and provided with a grasping portion 189. The screw 186 is provided with threads of different characters at its opposite ends, said screw having a right-hand threaded portion 190 in threaded engagement with one arm 185 and a left hand threaded portion 191 in threaded engagement with the other arm 185.

*Means to automatically move the cutter and polishing frames into inoperative position.*

I provide novel means to automatically move the cutter frame and the polishing frame into inoperative position whereby the article receiving carriage will automatically control such operation. Referring now more particularly to Figs. 1, 3, 8, 9, 10, 15, and 25, it will be seen that the article receiving carriage has adjustably mounted on the brace rods 56 the shoes 232 which are longitudinally adjustable thereon and located near the lower ends of the brace rods. I also provide an upper set of shoes 233 which are secured to the brace rods 56 and longitudinally adjustable thereon. The shoes 232 and 233 extend from opposite sides of the article receiving carriage, as will be best understood by reference to Figs. 3 and 9. The cutter frame is provided with arms 234 in the path of the lower shoes 232 and arms 235 in the path of the upper shoes 233. These arms 234 and 235 have their faces rounded or inclined to form cam members. The polishing frame is provided in a similar manner with the arms 236 and 237 coöperating with the upper and lower shoes 233 and 232 respectively in a similar manner to that just described with reference to the cutter frame. It will be seen that by such construction that as soon as the article receiving carriage approaches or reaches the limit of its upward or downward stroke, the cutting and polishing mechanism will be automatically moved into their inoperative positions and thus prevent any injury to the article blank upon the stopping of the article receiving carriage. This same construction is employed in the embodiment seen in Fig. 25 and I have therefore identified corresponding parts with the same reference characters.

The operation.

The operation of the copying lathe will now be readily apparent to those skilled in this part and is as follows:

The cutter frame can be moved out of its operative position by actuating the lever 51 and the polishing frame can be moved out of its operative position by actuating the lever 174.

The article blanks are secured to their respective article carriers and the apertures 88 receive the pins 89. The hand wheels 84 and 85 are adjusted to cause the rounded end 82 of a centering rod 81 to engage the recess 77 of an article carrier. The master patterns 121 are secured in the article carrier in the manner herein described and are locked in adjusted position by the nuts 127 and the fastening device 206. The master patterns are laterally adjusted relatively to the tracers by proper adjustment of the set screws 126 and 197 and the article blanks are adjusted relatively to the cutters and the buffers by proper adjustment of the set screws 86 and 87 and the set screws 193. The tracers on the cutter frame and the buffing or polishing frames are also laterally adjustable relatively to the master patterns by the proper adjustment of the set screws 136, 140 and 141 and of the nuts 147.

Assuming now that the master patterns, the article blanks and the tracers have been properly alined, the levers 51 and 174 are actuated to bring the cutter and polishing frames into their operative position.

The article receiving carriage is reciprocated in a vertical plane and tension devices are provided to cause the opposed tracers carried by the cutting frames and by the buffing frames to follow the contour of the master patterns. The main driving shaft 5 is continuously revolved and owing to the provision of the belts 27, 31 and 160, see more particularly Figs. 6 and 2, the cutter shafts and the buffer shafts are continuously revolved. The shaft 10 is normally stationary and provision is made for effecting its rotation in opposite directions by means of the belts 7 and 11 and the clutch mechanism which is controlled by the lever 16, see Figs. 1, 2 and 6. Assuming now that the lever 16 has been moved to interlock the clutch collar 13, with one of the pulleys 8 or 12, the shaft 10 will then be rotated and as this shaft is intergeared with the screws 24 the rotation of these screws 24 will be effected. Since the screws 24 are in threaded engagement with the sleeves 62 carried by the cross bars of the article receiving carriage, the article receiving carriage will have imparted thereto an upward or downward travel depending upon the direction of rotation of the screws 24.

Assuming that the article receiving carriage is at the upper or lower end of its travel, the operator actuates the arm 118, see Fig. 1, in order to actuate the reversing mechanism to cause the worm shaft 99 to revolve in the proper direction. Since the worm shaft 99 is intergeared with the gears 200 and 96, the master patterns 121 and the article blank 65 will be revolved. The tracers 128 of the cutter frame travel on the master patterns 121 so that the article receiving blanks are turned to conform to the shape of the master patterns 121. During this cutting or turning operation the buffing or polishing frame is preferably moved into its inoperative position as seen in Fig. 11 by the proper actuation of the lever 174. In case it is desired to buff or polish the articles being formed simultaneously with the cutting operation, the lever 174 is swung downwardly and the tension device 178 is connected to the arm 179. This causes the tracers 177 of the buffer frame to follow the master pattern 121. Since it is essential that the buffing or polishing devices follow the cutters, I provide means for shifting the location of the buffers or polishers relatively to the cutters so that they will be above the cutters on the downward movement of the article receiving carriage and will be below the cutters on the upward movement of the article receiving carriage. It will be seen more clearly from Figs. 1, 11 and 12 that the manual actuation of the handle 171 will cause the shoe 167 to be raised or lowered depending upon whether the handle 171 is rotated in a clockwise or a counter-clockwise direction. The upward movement of the shoe 167 causes the rod or link 166 to be raised thereby moving the crank arm formed by a journal bracket and thereby the brackets 156 on their fulcrums and causing the buffer frame to be lowered so that the buffing elements 164 will be located below the cutters. By moving the shoe 167 downwardly the brackets 156 will be moved on their fulcrum to effect the raising of the buffer frame and thereby cause the buffing elements 154 to be located above the cutters as is evident.

During the downward travel of the article receiving carriage, the article blanks are turned and polished and as soon as the carriage reaches or approaches the limit of its downward stroke, the shoes 223 engage the arms 235 and automatically move the cutter frame into its inoperative position. The articles which now conform to the master patterns as seen in Figs. 21 and 22 are ready to be removed from the machine to be subjected to further operation. The cutter and polishing frames are swung out of the way and the hand wheels 84 and 85 actuated to move the centering pins downwardly to disengage them from their blank carrier 66, whereupon the turned and polished articles 192 are removed from the carriage. The actuating handle 75 is actuated to effect the separation of the clamping jaws 70 whereupon the blank carriers 66 can be removed from their respective articles 192. A new set of article blanks 65 is then assembled with respect to the article receiving carriage in the manner hereinbefore described. The lever 16 is then actuated to start the machine and to effect the rotation of the worm shafts 24 in a direction to cause the article receiving carriage to travel upwardly, it being understood that prior to such operation the polishing frame has been adjusted to bring the polishing elements below the cutters. If it is desired at any time during the operation to move the cutters or polishers relatively to the article receiving carriage this can be accomplished by the manual actuation of the levers provided for such purpose. The tracers 128 of the cutter frame and the tracers 177 of the buffer or polishing frame may be accurately adjusted with respect to the master pattern 121 by rotating the handle 139 to cause the rotation of the screw 136 and thereby effect the lateral adjustment of the sleeve 131, it being understood that the set screws 140 and 141 are correspondingly adjusted, and the nuts 147 loosened to permit such adjustment. After the adjustment has been effected the nuts 147 are tightened in order to coöperate with the set screws 140 and 141 in securing the tracers in their adjusted position on the lower cross bars of the cutter frame and buffer frame respectively. The master patterns and the article blanks are also mounted in such a manner that they can be laterally adjusted. By the proper actuation of the set screws 193, the sleeve 92 in which the shaft 91 is mounted may be laterally adjusted, as will be best understood by reference to Fig. 16.

The centers which support the lower ends of the master pattern and the lower ends of the article receiving blanks are also adapted to be laterally adjusted. By actuating the screws 126 the centers 124 which engage the lower end of the master patterns may be laterally adjusted as is apparent. By actuating the set screws 86 and 87 the centers 81 may be laterally adjusted to effect the lateral adjustment of the lower end of the article blanks, as will be best understood by reference to Figs. 10 and 13. The centers 203 may be laterally adjusted by actuating the set screws 197 and they may be rotatably adjusted by actuating the split collar 205 and rotating the centers.

My present invention while not limited to such use is especially designed to turn and polish gun stocks and since different types of gun stock vary in length, the article receiving carriage is adjustable to accommodate different lengths of master patterns and article blanks. By adjusting the set screws 57, see Fig. 8, the distance between the upper cross bar 54 and the lower cross bar 55 of the article receiving carriage may be varied as desired.

In some cases arising in practice it is advantageous to employ in lieu of the buffers 164 a buffing or polishing belt 182, as seen in Fig. 28. This buffing belt 182 is driven by pulleys or disks 181 mounted on the buffer shaft 153 in any desired manner. The buffing belt 182 can be tightened as occasion requires by the proper actuation of the hand wheel 189, as will be apparent to those skilled in the art to which this invention appertains.

It will be understood from Figs. 2, 3 and 6 that the frame of the machine carries two sets of cutting, buffing and article receiving carriage mechanism located on opposite sides of the machine so that a single operator can control the operation of two different sets of mechanism, so that while one set is operating the article blanks can be inserted in one article receiving carriage or the articles when finished can be removed therefrom without necessitating the stopping of the machine. By such construction a maximum output can be produced with a minimum amount of operating expense.

Special attention is directed to the novel means provided for the adjustment of the tracers so that any wear on the tracers or patterns can be compensated for and articles produced of standard dimensions. While I can either turn or polish independently of each other I preferably perform both operations simultaneously so that the opposed cutting and polishing devices place a substantially equal tension on both the master pattern or patterns and the article blanks. The polishing and cutting frames are pivotally supported so that they can be swung toward the work during the rotation of the polishing and cutting devices.

It will further be apparent that a great economy of time is effected by my machine, since the turning and polishing devices, after operating vertically in one direction upon the blank of the article to be produced, may upon the removal of said article and the insertion of another blank, be utilized during their movement in a reverse vertical direction to shape said latter blank or blanks, the shaping and polishing operations being obviously performed in reverse sequence.

It will be understood that my novel construction of copying lathe in its broad aspects is capable of turning and polishing a variety of irregular forms supported in a vertical position, and that it is capable of turning or polishing single or multiple parts at one and the same time in an expeditious and effective manner.

While my invention in its broad aspects is obviously capable of adaptation to a large variety of irregular forms, I have shown the present embodiment as adapted particularly for shaping and polishing gun stocks, the polishing being effected either simultaneously with the turning or shaping operations or at other periods of the operation at the will of the operator.

In its present embodiment, my novel machine is particularly adapted to the turning and polishing of gun stocks by a series of successive operations which turn and polish or finish in succession the butt 227, comb 228, grip 229, head 230, and barrel portion 231 of the stock, see Figs. 21 and 22, when the article to be turned is propelled in one direction, the cutters and polishing devices when moved in the reverse vertical direction obviously producing the above gun stock elements in the reverse order, whereby a great economy of time and labor is effected.

It has heretofore so far as I am aware been the practice to produce or finish the aforesaid portions of a gun stock by a series of segregated steps or operations carried out in different segregated mechanisms, and so far as I am aware, I am the first in the art to produce a machine wherein the turning or shaping operations for the above-mentioned portions of a gun stock can be automatically effected consecutively or in sequence in the manner described.

I am also the first in the art to provide a machine wherein the above-mentioned portions of a gun stock can be successively and consecutively turned and simultaneously polished in the manner hereinbefore described, and my claims to these features are to be interpreted with the corresponding scope awarded to inventions of this character.

It will be apparent from an inspection of the drawings that in accordance with my present invention, the cutting mechanism is frictionally driven and provision is made whereby the cutter frame whenever desired can be moved into or out of its operative position with respect to the article blanks and the master patterns without arresting the rotation of the cutting elements or without disconnecting the gearing, provided for driving the cutters.

It will also be apparent that the buffing or polishing elements can be moved into or out of their operative relation with respect to the articles without arresting the rotation of the buffing or polishing elements and without disconnecting their driving gearing.

It will be understood that by such construction the gun stocks or other articles of irregular contour, may be rapidly reproduced in accordance with the contour of the master pattern, since it is not necessary to arrest the rotation of the cutting or polishing devices.

It will be apparent from the foregoing that I provide means controlled by the article receiving carriage to move either the cutting frame or polishing frame or both into their inoperative position when the carriage reaches the proper point in its travel. On the downward travel of the article receiving carriage, the shoes 233 will engage the arms 235 and 237 to move the cutting and polishing frames away from the work and bring their cutting and polishing elements into an inoperative position. On the upward stroke of the article receiving carriage, the shoes 232 will engage the arms 234 and 236 and move the cutting and polishing frames into their inoperative position. The above action can be accomplished without affecting the rotation of the cutting and polishing elements.

My invention also involves a novel method of turning a gunstock wherein the gunstock blank is supported in a vertical plane and then by a vertical series of consecutive operations the butt, comb, grip, head and barrel of the stock are turned and shaped and simultaneously with such operation the butt, comb, head and barrel of the stock are polished in consecutive order. I then remove the finished blanks and secure other blanks in position and by a reverse vertical series of consecutive operations shape and if desired simultaneously therewith polish the barrel, head, grip, comb and butt in the order named.

It will now be apparent that I have devised a novel and useful construction of a copying lathe which embodies the features of advantage enumerated as desirable in the statement of the invention and the above description, and while I have, in the present instance, shown and described preferred embodiments thereof which will be found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a copying lathe, a frame having vertically directed stationary guides, an article carriage engaging said guides and having a cross bar, sleeves laterally adjustable on said cross bar, shafts rotatable in said sleeves and having means to engage an article blank, centering devices vertically and laterally adjustable on said carriage and engaging the article blanks, a master pattern on said carriage, means to rotate said shafts and said master pattern, means to reciprocate said carriage in a rectilinear path in a vertical plane, said shafts rotating in a reverse direction when the direction of movement of the carriage is reversed, and devices controlled by said master pattern to shape the article blanks to conform to said master pattern, said shaping devices including a cutting frame swingingly supported at its upper end, and yielding means to move the lower end of said cutting frame toward said carriage.

2. In a copying lathe, a frame having vertically directed stationary guides, a carriage to engage said guides, a master pattern on said carriage, means to secure article blanks on said carriage, means to rotate said master pattern and article blanks, a cutter frame swingingly supported at its upper end, yielding means to move the lower end of said cutter frame toward said carriage, sleeves in said cutter frame having a top flange thereon, means engaging said flange to laterally adjust said sleeves, means to lock said sleeves in adjusted position, shafts mounted in said sleeves, tracers rotatably carried by said shafts, a tension device to retain said tracers in engagement with said master patterns, cutting mechanism journaled in the cutter frame to rotate in substantially a horizontal position, and means to reciprocate said carriage in a rectilinear path in a vertical plane, said cutting mechanism rotating in a reverse direction when the direction of movement of said carriage is reversed.

3. In a copying lathe, an article carriage, a master pattern thereon, means to secure article blanks in said carriage, a screw intergeared with said carriage to reciprocate it in a vertical plane, means to effect the rotation of said master pattern and the article blank in one direction during the downward movement of the carriage and in a reverse direction during the upward movement of said carriage, and cutting means controlled by said master pattern to shape the blank, said cutting means rotating in a reverse direction when the direction of movement of the carriage is reversed.

4. In a copying lathe, an article carriage, stationary guides to cause it to travel in a rectilinear path in a vertical plane, a screw intergeared with said carriage to feed it, reversing mechanism on said carriage, a master pattern in said carriage, means to secure article blanks in said carriage, means operatively connected with said reversing mechanism to rotate said master pattern and article blanks in one direction when the carriage is moved upwardly and in a reverse direction when the carriage is moved downwardly, rotatable blank cutting mechanism controlled by the master pattern and rotating in a reverse direction when the direction of movement of the carriage is reversed.

5. In a copying lathe, a shaft, sets of opposed friction disks thereon, a cutting frame pivotally supported at its upper end on said shaft, cutter shafts mounted in said frame, a friction disk on each cutter shaft and engaging a set of opposed disks, an article carriage, means to reciprocate said carriage in a rectilinear path in a vertical plane, a master pattern on said carriage, a tracer on said cutting frame to engage said master pattern, means to rotate said master pattern and the article blanks, cutters at the lower end of said cutting frame to cut said blanks, said pattern and said blanks rotating in one direction when the carriage is moving upwardly and rotating in a reverse direction when the carriage is moving downwardly.

6. In a copying lathe, a reciprocatory carriage, a lower center longitudinally and laterally adjustable thereon, a master pattern having one end rotatable on said lower center, an upper center interlocked with said master pattern and having a cone-shaped head, a drive shaft having a cone-shaped head juxtaposed to the cone-shaped head of said center and forming therewith reversely inclined faces, a bracket interlocked with said heads to maintain them in adjusted position, means to laterally adjust said drive shaft, actuated means for said drive shaft, and means controlled by said master pattern to define the contour of the finished article.

CHARLES L. SCHWARZ

Witnesses:
E. HAYWARD FAIRBANKS,
H. S. FAIRBANKS.